(12) United States Patent
Lillie et al.

(10) Patent No.: US 10,601,737 B2
(45) Date of Patent: Mar. 24, 2020

(54) REGISTER READ AND WRITE OPERATIONS OVER AUTO NEGOTIATION NEXT PAGES

(71) Applicant: Intel Corporation, Santa Clara, CA (US)

(72) Inventors: K. Andrew Lillie, Chandler, AZ (US); Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 15/749,650

(22) PCT Filed: Aug. 30, 2016

(86) PCT No.: PCT/US2016/049424
§ 371 (c)(1),
(2) Date: Feb. 1, 2018

(87) PCT Pub. No.: WO2017/040489
PCT Pub. Date: Mar. 9, 2017

(65) Prior Publication Data
US 2018/0219803 A1 Aug. 2, 2018

Related U.S. Application Data

(60) Provisional application No. 62/212,090, filed on Aug. 31, 2015.

(51) Int. Cl.
*G06F 15/16* (2006.01)
*H04L 12/879* (2013.01)
(Continued)

(52) U.S. Cl.
CPC ........ *H04L 49/901* (2013.01); *G06F 13/1673* (2013.01); *G06F 13/4045* (2013.01);
(Continued)

(58) Field of Classification Search
CPC .................................................. H04L 49/3054
See application file for complete search history.

(56) References Cited

U.S. PATENT DOCUMENTS 5,907,553 A * 5/1999 Kelly ...................... H04L 12/10
370/433
6,169,729 B1 * 1/2001 Feuerstraeter ........ H04L 49/351
370/296

(Continued)

*Primary Examiner* — Hieu T Hoang
(74) *Attorney, Agent, or Firm* — Law Office of R. Alan Burnett, P.S

(57) ABSTRACT

Methods and apparatus for register Read and Write operations over Auto Negotiation Next Pages. Register Reads and Writes are implemented using sequences of Auto Negotiation (AN) Next Page messages. The embodiments define mechanisms to use AN Next Pages to carry write and read instructions. It defines a bi-directional communication mechanism to allow writes to be confirmed and read data to be returned to the requestor. Sequences of several AN Next Pages are used to assemble full address and data fields, when necessary. Two link partners (endpoints or an endpoint and an intermediate partner) exchange AN Next Pages with address and data information. The method uses a unique device address assigned to each device discovered in the serial chain to enable write and read operations to specific devices.

30 Claims, 10 Drawing Sheets

(51) Int. Cl.
  *H04L 29/12* (2006.01)
  *G06F 13/40* (2006.01)
  *H04L 29/06* (2006.01)
  *H04L 12/24* (2006.01)
  *G06F 13/16* (2006.01)
  *H04L 12/947* (2013.01)
  *H04L 12/935* (2013.01)

(52) U.S. Cl.
  CPC ............ *H04L 41/08* (2013.01); *H04L 49/252* (2013.01); *H04L 49/3054* (2013.01); *H04L 61/2038* (2013.01); *H04L 61/2092* (2013.01); *H04L 69/24* (2013.01)

(56) References Cited

U.S. PATENT DOCUMENTS

| | | | | |
|---|---|---|---|---|
| 6,215,816 B1* | 4/2001 | Gillespie | ................ | H04L 12/44 370/402 |
| 6,349,331 B1* | 2/2002 | Andra | ............... | H04L 12/40032 709/220 |
| 6,859,825 B1* | 2/2005 | Williams | ................ | H04L 29/06 709/220 |
| 7,292,597 B2* | 11/2007 | Mills | ...................... | H04L 12/12 370/433 |
| 2002/0009081 A1* | 1/2002 | Sampath | ............... | H04L 12/462 370/389 |
| 2009/0129777 A1* | 5/2009 | Singh | .................. | H04L 43/0852 398/58 |
| 2009/0132735 A1* | 5/2009 | Gelberg | .................. | H04L 49/90 710/52 |
| 2010/0228964 A1* | 9/2010 | Booth | .................... | H04L 63/16 713/151 |
| 2011/0261720 A1* | 10/2011 | Diab | .................. | H04L 41/0873 370/254 |
| 2015/0381565 A1* | 12/2015 | Thaler | ...................... | H04L 61/2046 370/389 |
| 2016/0013978 A1* | 1/2016 | McLoughlin | ......... | H04L 41/083 709/221 |
| 2016/0164736 A1* | 6/2016 | Lusted | ................ | H04L 41/0886 370/254 |
| 2016/0205224 A1* | 7/2016 | Chini | .................... | H04L 69/08 455/422.1 |

* cited by examiner

| STEP | End Point: Near | Intermediate Device 1 | Intermediate Device 2 | End Point: Far |
|---|---|---|---|---|
| 5 | 102<br>NP-OUI: DA=0, ACK, ACK2  TX -><br>RX <- | -> RX  NP-OUI: DA=0, ACK,  DA=1  NP-OUI: DA=1, ACK,  TX -><br><- TX  ACK2  RX <-  106-1 | -> RX  NP-OUI: DA=1, ACK,  DA=2  NP-OUI: DA=2, ACK,  206  TX -><br><- TX  ACK2  RX <-  106-2 | -> RX  104<br>NP-OUI: DA=2, ACK, ACK2<br><- TX<br>NP-NM |
|  |  | 202  (n1++) | Start count of NMs (n2=0,++) |  |
| 6 | NP-OUI: DA=0, ACK, ACK2  TX -><br>RX <- | -> RX  NP-OUI: DA=0, ACK,  DA=1  NP-OUI: DA=1, ACK,  TX -><br><- TX  ACK2  RX <- | -> RX  NP-OUI: DA=1, ACK,  DA=2  NP-OUI: DA=2, ACK,  TX -><br><- TX  ACK2  RX <- | -> RX<br>NP-OUI: DA=2, ACK, ACK2<br><- TX<br>NP-NM |
|  |  | 202  n1 = TBD | (n2++) |  |
| 7 | NP-OUI: DA=0, ACK, ACK2  TX -><br>RX <-<br>NP-OUI: DA=1, ACK, ACK2<br>Start count of NP-OUI<br>(nOUI=0,++) | -> RX  NP-OUI: DA=0, ACK,  DA=1  NP-OUI: DA=1, ACK,  TX -><br><- TX  ACK2  RX <-<br>NP-OUI: DA=1, ACK,  ACK2 | -> RX  NP-OUI: DA=1, ACK,  DA=2  NP-OUI: DA=2, ACK,  TX -><br><- TX  ACK2  RX <-<br>n2=TBD | -> RX<br>NP-OUI: DA=2, ACK, ACK2<br><- TX<br>NP-NM |
| 8 | NP-OUI: DA=2, ACK, ACK2  TX -><br>RX <-<br>(nOUI++) -> nOUI=m*TBD | -> RX  NP-OUI: DA=2, ACK,  DA=1  NP-OUI: DA=1, ACK,  TX -><br><- TX  ACK2  RX <- | -> RX  NP-OUI: DA=2, ACK,  DA=2  NP-OUI: DA=2, ACK,  TX -><br><- TX  ACK2  RX <- | -> RX<br>NP-OUI: DA=2, ACK, ACK2<br><- TX<br>NP-NM |

*Fig. 2b*

REGISTER READ AND WRITE OPERATIONS OVER AUTO NEGOTIATION NEXT PAGES

CROSS-REFERENCE TO RELATED APPLICATION

This patent application is a U.S. National Phase Application under 35 U.S.C. Section 371 of International Application No. PCT/US2016/049424, filed on Aug. 30, 2016, entitled "REGISTER READ AND WRITE OPERATIONS OVER AUTO NEGOTIATION NEXT PAGES" which claims benefit of provisional 62/212,090, filed on Aug. 31, 2015, which is hereby incorporated herein by reference in its entirety and for all purposes.

BACKGROUND INFORMATION

In serial input/output communications, a single or multiple re-driver or re-timer device(s) are often used to extend the reach of the communication link. As serial bit data rates increase the signal integrity requirements lead to more complex buffering (re-driver and re-timer) devices, which in turn require increased levels of configuration.

One problem is that the configuration of the buffering devices often requires individual non-volatile memory (NVM) devices for each buffer. These NVM devices contain the configuration information for each of the re-timer or re-driver devices (which typically include default values) and in cases where there are multiple serially-connected devices they will have different configurations. This is an issue for Ethernet applications on large system boards.

Currently, end-point devices can only use predefined functions to configure intermediate devices as part of the Auto-Negotiation process. Configuration registrations can only be accessed by the MDI (Medium Dependent Interface) or similar out-of-band bus, which requires addition system complexity and components.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 2a and 2b collectively show a message flow sequence for discovering and assigning addresses to intermediate devices in a communications link that traverses a serial chain of devices, according to one embodiment;

DETAILED DESCRIPTION

Figure 1:
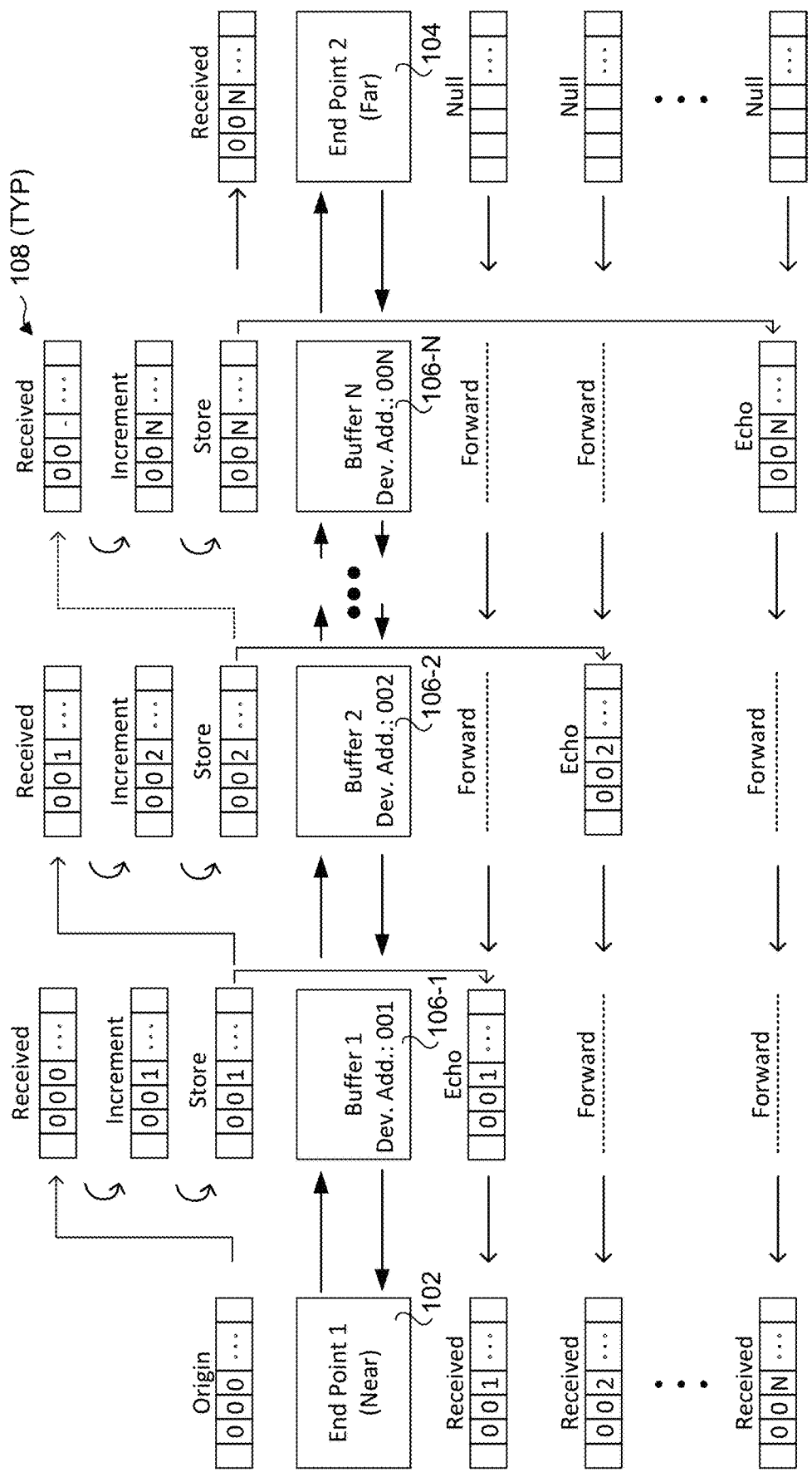
FIG. 1 is a combination schematic block and message flow diagram illustrating an overview of one embodiment to discover and assign addresses.

Embodiments of methods and apparatus for register Read and Write operations over Auto Negotiation (AN) Next Pages are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

High-speed links, such as 25 Gigabit per second (Gb/s) and 100 Gb/s Ethernet links, have very precise signaling requirements that limit the length of a given link (e.g., due to degradation of signals as they are transmitted over the link. To extend the length of the link, intermediate devices comprising re-driver and/or re-timer devices are inserted, thus forming multiple linked segments. In a serial chain of such devices the devices at each end (called the "endpoints") of the serial chain will communicate with each other to establish a link. During this link establishment phase, each intermediate device will forward the received signal and information to the next device in the chain.

Typically, an intermediate device will have a default configuration, including a default address. This poses a problem when multiple intermediate devices of the same type are part of the serial chain of devices, since if may be necessary to adjust configuration parameters in connection with establishing a link. Thus, each intermediate device needs to be uniquely identified in order to adjust its configuration. In accordance with aspects of the embodiments disclosed herein, techniques are provided that enable an endpoint to discover any and all serially-connected signal buffering devices and provides a way to uniquely identity each one, assign an address and configure each from a central NVM over the bus' in-band configuration protocol.

In one embodiment, the first intermediate buffering device following the originating endpoint device receives a data value called "Device Address" from the endpoint. It increments the address by a count of 1, stores this value, and then forwards this new value to the next device in the chain. The value it has recorded is its unique device address and will be used when the originating endpoint needs to send unique information to that intermediate device. A second or subsequent intermediate device will receive the forwarded Device Address value and it increments it to become its own unique address. This continues until the endpoint at the far end of the link is reached. The final value of the Device Address value is returned to the originating endpoint and as such it knows how many devices are in the chain and how to address each one.

Using a central NVM to configure multiple devices over an in-band communication protocol reduces the number of NVM devices needed to configure each device. This reduces costs and complexity of the platform. It also improves usability because only one NVM program needs to be maintained. The alternative is to provide each device its own NVM which it loads on initialization. This requires extra components and NVM program development for each device. It also means that each device needs more control logic to enable the NVM execution and IO to access the NVM.

Another approach is to use an I2C or similar bus to address each device, but unique buses or unique addresses for each must be assigned and programmed, and a central controller is needed to read the NVM and issue the I2C operations. Embodiments disclosed herein minimizes the number of devices and buses needed and centralizes the management of the interface. Moreover, in one embodiment, existing communication protocols and frame structures are leveraged using standardized Auto Negotiation "Next Pages" to transparently manage the overall link, as described below in further detail.

FIG. 1 is a combination schematic block and message flow diagram illustrating an overview of one embodiment to discover and assign addresses. A link chain 100 includes a near endpoint device 102 that communicates with a far endpoint device 104 via N intermediate buffer devices 106-1 . . . 106-N. For simplicity and convenience, intermediate buffer devices 106-1 . . . 106-N may also be referred to as Buffer 1 . . . Buffer N, as illustrated. FIG. 1 includes the feedback to the origin of the last address assigned and an indication of the number of devices before reaching the far-end End Point.

Each of the near and far endpoint devices 102 and 104 and intermediate buffer devices 106-1 . . . 106-N will include various circuitry and embedded logic for implementing corresponding functionality, a portion of which is configured to support link initialization operations. In one embodiment this will include a plurality of registers 108, which may comprise any type of register or otherwise any type of logic circuitry capable of storing (temporally or persistently) a value.

Figure 2A:
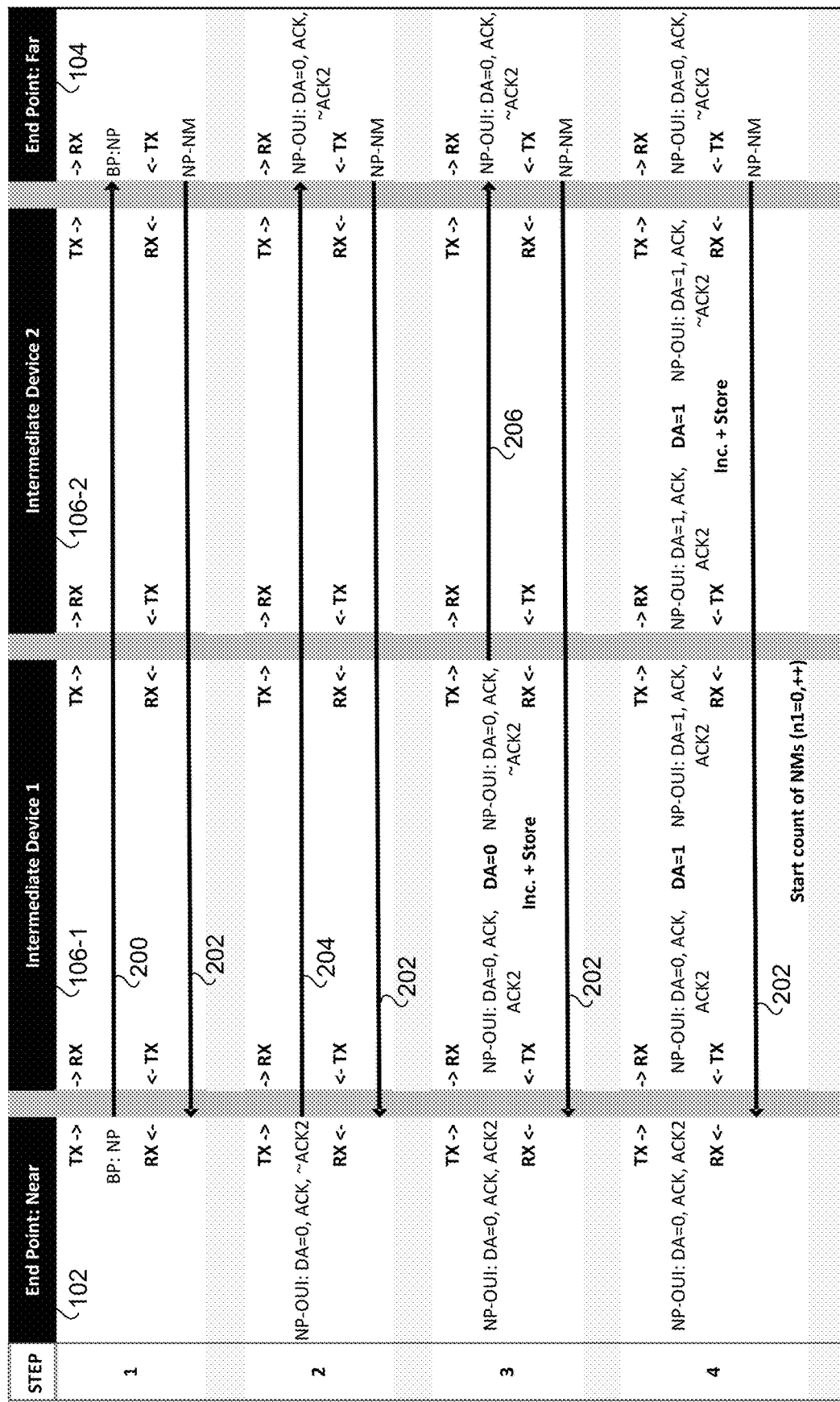

FIGS. 2a and 2b are first and second parts of a message flow diagram illustrating a sequence of messages exchanged between the various components in the linked chain 100 to initialize a link between near and far endpoint devices 102 and 104. In FIG. 2 the gray vertical bars represent the link segments between the devices, while TX→ and →TX represents transmit ports depicting the direction of transmission and RX→ and →RX represent receive ports showing the direction of signals being received.

The following steps (and corresponding steps shown in FIGS. 2a and 2b) are described using terms and methodology used to describe the Ethernet Auto-Negotiation procedure defined in Institute of Electrical and Electronics Engineers (IEEE) 802.3—2012 Clause 73. However, the use of the Ethernet Auto-Negotiation procedure is merely an exemplary use case, and is not limiting, as other embodiments may use other procedures for performing auto-negotiation. Moreover, the techniques disclosed herein are not limited to Ethernet, but rather may be implemented for various types of communication links using various protocols.

The Auto-Negotiation function allows an Ethernet device to advertise modes of operation it possesses to another device at the remote end of an Ethernet link and to detect corresponding operational modes the other device may be advertising. The objective of the Auto-Negotiation function is to provide the means to exchange information between two devices that share a link and to automatically configure both devices to take maximum advantage of their abilities.

Exemplary Procedure for Discovery and Configuration of Intermediate Link Devices Step 1. After initial link establishment and an exchange of base pages (BP) 200 with the Next Page (NP) bit set, the Device Discovery and Addressing phase can commence with its Organizationally Unique Identifier (OUI) message Next Page. When the far-end End Point completes its own Next Pages and is transmitting Next Pages with a Null Message (NP-NM) 202 the Device Discovery phase beings. As illustrated in FIGS. 2a and 2b, the far End Point will continuation to transmit NP-NM messages 202 to the near End Point throughout various steps during the procedure.

Step 2. An OUI Next Page 204 is transmitted from the near End Point with the Message Page bit set to logical one and with a message code field containing the OUI. The OUI identifies the message to devices that can support Device Discovery and Addressing. The Next Page bit is set to logical one. ACK (ACKnowledgement) is set to logical one to prepare all devices in the chain for the incoming messages. ACK2 is set to logical zero (The "~" character represents not set, i.e., logical zero). The Next Page Toggle bit will function as normally defined in all messages. This initial OUI Next Page is forwarded by all devices to the far End Point. A bit field in the Unformatted Code Field of the OUI message is identified to contain the Device Address (DA) value and it is initialized to zero in one embodiment. Generally, the initial DA value may be any valid address value; the use of a zero initial DA value is merely exemplary.

Step 3. After sufficient time has elapsed to ensure that all intermediate devices have recognized the OUI message, the near-end (origin) End Point will assert ACK2. Upon recognizing the change in logical value of ACK2, the first intermediate device will begin its DA increment and store operation. The first intermediate device continues to transmit the original OUI with ACK2 set to logical zero (as depicted by a message 206) until it has updated the Device Address (DA) in the outgoing message to the far-end.

As shown in FIG. 1, the DA increment and store operation is used to configure the address for each intermediate device. A given intermediate device receives a DA from its preceding device in the serial chain, increments the DA, and then stores the incremented value as its own DA. It then forwards its DA to the next intermediate device in the chain, and the DA increment and store operation is repeated.

Step 4. Intermediate device 1 updates the upstream message (206) to the far End Point with the incremented Device Address (DA=1) and asserts ACK2 to logical one. At this time the receive side of Intermediate Device 1 starts a counter (n1) to count the number of Null Messages (NM) received from the far End Point. Upon receipt of ACK2 asserted to logical one, intermediate device 2 begins its increment and store operation.

Step 5. Intermediate device 2 updates its outgoing upstream message 208 with ACK2 set to logical one once its Device Address is updated in the message (DA=2). It starts a Null Message counter (n2) on the receive side from the far-end End Point. The far-end End Point does not respond to the OUI. As each NP-NM message 202 is received by Intermediate devices 1 and 2, their respective n1 and n2 counters are incremented.

Step 6. Intermediate Device n1 counter reaches the determined number of Null Messages on its receiver from the far-end End Point.

Step 7. At this point, Intermediate Device 1 replaces the incoming NP-NM messages 202 with the OUI Next Page and transmits its device address with ACK2 set to logical one to the near-end End Point/origin device.

Step 8. Intermediate Device 2's Null Message counter (n2) reaches the determined count and inserts the OUI Next Page with its Device Address (DA=2). Intermediate Device 1 recognizes the change on its upstream receiver and forwards the new message to the near-end End Point: The origin waits for sufficient time to ensure that all intermediate devices have reported their assigned addresses to the origin before discontinuing the discovery phase and transmitting Null Message Next Pages at which point Auto Negotiation will complete since both sides are transmitting Null Messages.

Returning to FIG. 1, the foregoing procedure can be applied to N intermediate devices in a similar manner. As shown, in one embodiment that starts with a base device address of 0, each device on the change will have the same device address as its order in the serial chain, e.g., first device address=1, second device address=2, Nth device address=N. The address of the Nth device (buffer N) is echoed back to its preceding device, and henceforth the remaining devices in the chain will forward the Nth device address back to the originating device (End Point 1). Upon inspection, the originating device can determine both the number of intermediate devices in the change and the unique address for each device.

In one embodiment, device addresses are echoed back by adding the device address to AN Next Page Message sent from far endpoint device 104 to the near endpoint device 102. In one embodiment, once a given intermediate devices has stored its device address, that DA is added to each AN Next Page Message originating from far endpoint device 104 until the given intermediate device detects that a device address has already been added to an AN Next Page Message by the next device in the serial chain of devices.

As mentioned above, the use of 0 for the base address of the origin device is merely exemplary. Substantially any address could be used as a base address for the origin device. In addition, incrementing the address by 1 is also merely exemplary. Generally, each intermediate device can increment the address it receives by a predetermined amount to establish its own address. For example, the increment could be 1, 5, 10, or any predetermined integer. By knowing the increment being used, the originating device can determine the number of intermediate devices in the chain, as well as the unique address for each intermediate device.

Register Read and Write Operations over Auto Negotiation Next Pages

Embodiments disclosed herein define mechanisms to use Auto Negotiation OUI Next Pages to carry register write and read instructions. They define a bi-directional communication mechanism to allow writes to be confirmed and read data to be returned to the requestor. Sequences of OUI Next Pages are used to assemble full address and data fields, when necessary. Two link partners (two endpoints or an endpoint and an intermediate partner) exchange OUI Next Pages with address and data information. The method uses a unique device address assigned to each device discovered in the serial chain to enable write and read operations to specific devices.

The following detailed description explains how Management Data Input/Output (MDIO) addressing can be performed over Ethernet Auto-Negotiation (specifically using IEEE 802.3 clause 73 AN). However, this is merely exemplary, as other address and data structures can be implemented using different OUIs, by following similar principles.

IEEE 802.3 Clause 45 Management Data Input/Output (MDIO) addressing specifies an 8 b MMD (MDIO Manageable Device) (Table 45-1 in IEEE 802.3—2012). This is implemented using a 32-bit register that is logically partitioned into two 16-bit values:
1. 16 b Register Address
2. 16 b Data Read/Written In addition to the above register bit requirements, an additional 4 b is included for device addressing (beyond that of the 8 b MMD) for cases where multiple identical devices are used at intermediate points on a serial chain, such as retimers.

As defined in Clause 73 and Annex 73A, an OUI consists of a Message Page and an Unformatted Page which together create an OUI with an available 20 b for user defined data. These 20 b will be used to contain the MDIO addressing structure for read and write operations.

Figure 3:
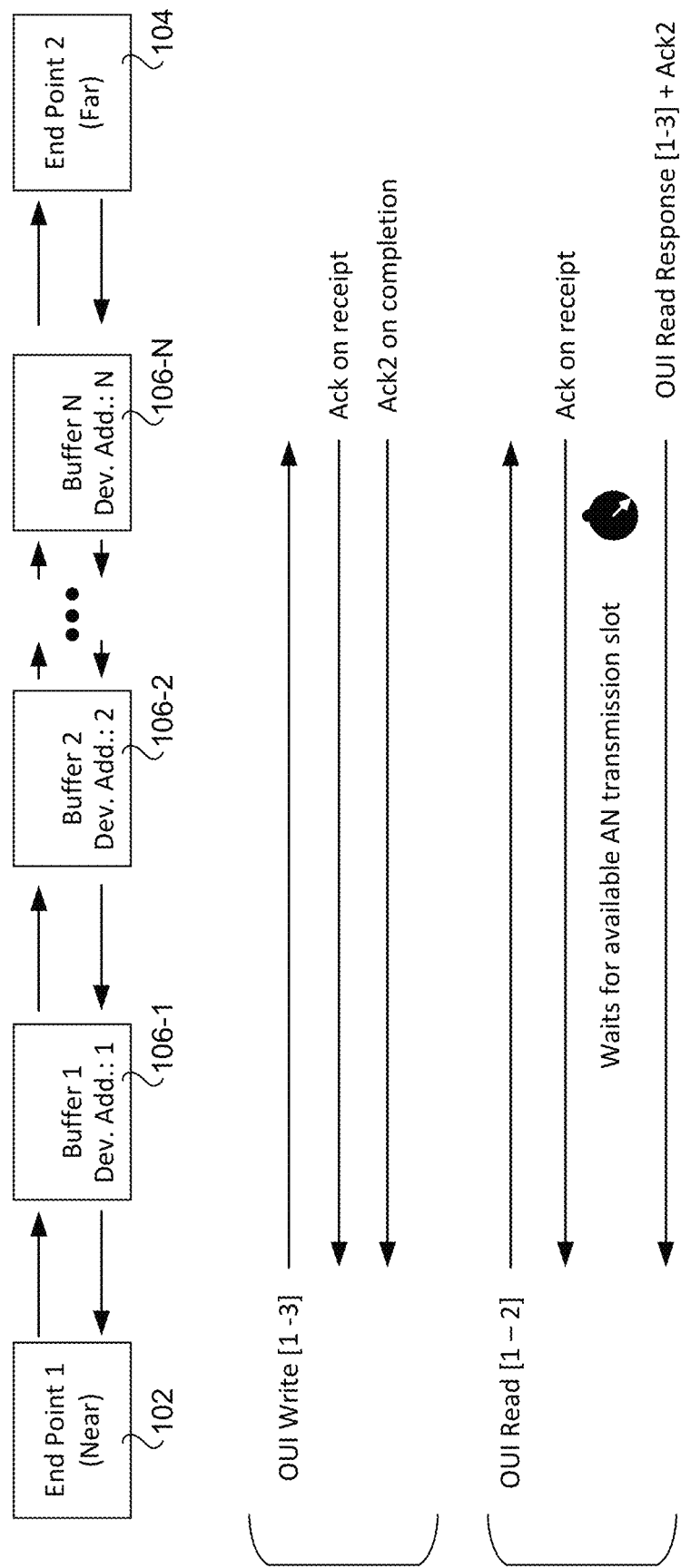
FIG. 3 is a combination schematic block and message flow diagram illustrating the event sequences for OUI Write and Read (followed by Read Response) operations, according to one embodiment.

FIG. 3 shows the event sequences for Write and Read (followed by Read Response) operations, according to one embodiment. In the example, the serial chain of devices at the top of FIG. 3 is the same as that shown in FIG. 1, as discussed above. Below the serial chain of devices is an exemplary OUI Write and OUI Read event sequence pattern using AN OUI Next Pages.

Performing a Register WRITE using OUI Next Pages

As illustrated in FIG. 3 by "OUI Write [1-3]", a register Write is performed using three OUI Next Pages in succession. More particularly, a specific OUI is used for a Write, as shown in TABLE 1 below.

TABLE 1

| | Next Page Bits | |
| --- | --- | --- |
| | 26:16 | 8:0 |
| OUI Write 1 | 18:16 Device Address | 7:0 MMD |
| | 23:19 Reserved | 8 Reserved |

TABLE 1-continued

| | Next Page Bits | |
|---|---|---|
| | 26:16 | 8:0 |
| OUI Write 2 | 23:16 MDIO Address (MSB) 26:25 Reserved | 7:0 MDIO Address (LSB) 8 Reserved |
| OUI Write 3 | 23:16 MDIO Data to be written (MSB) 26:25 Reserved | 7:0 MDIO Data to be written (LSB) 8 Reserved |

As shown in the header of TABLE 1, the Next Page Bits are divided into bits 26:16 and bits 8:0 of the 32-bit AN format. OUI Write 1 uses bits 18:16 for the Device Address and bits 7:0 for the MMD, with bits 23:19 and 8 Reserved. OUI Write 2 uses bits 13:16 for the MSB (most significant byte) of the MDIO Address, and bits 7:0 as the LSB (least significant byte) of the MDIO Address, with bits 26:25 and 8 Reserved. OUI Write 3 uses bits 23:16 as the MSB for the MDIO data to be written, and bits 7:0 for the LSB of the MDIO data to be written, with bits 26:25 and 8 Reserved.

Upon receipt of the OUI Write 3 message the link partner will set Ack to logical one. Upon completion of the Write function the link partner will set Ack2 to logical one.

To perform a write/read compare operation the endpoint performing the write will perform a read and compare the read data with that intended to be written.

Performing a register READ using OUI Next Pages

To implement a register Read using OUI Next Pages, two OUI Next Pages are used to communicate the address that is to be read, as shown in TABLE 2 below.

TABLE 2

| | Next Page Bits | |
|---|---|---|
| | 26:16 | 8:0 |
| OUI Read 1 | 18:16 Device Address 23:19 Reserved | 7:0 MMD 8 Reserved |
| OUI Read 2 | 23:16 MDIO Address (MSB) 26:25 Reserved | 7:0 MDIO Address (LSB) 8 Reserved |

In OUI Read 1, bits 18:16 are used for the Device Address, and bits 7:0 are used for the MMD, while bits 23:19 and 8 are Reserved. In OUI Read 2, bits 23:16 are used for the MSB of the MDIO Address, while bits 7:0 are used for the LSB of the MDIO Address and bit 8 is Reserved.

Upon receipt of the OUI Read 2 Next Page, the link partner will respond with its Ack bit set to logical one.

The data to be read is returned to the requestor by the device being read using a Read Response set of OUIs, as shown in TABLE 3 below. With the transmission of these Read Response OUIs, the Ack2 bit is set to indicate that the Read Operation is completed. The responding partner is required to insert the Read Response Next Pages into its own AN stream when it there is time to do so. This is why the response includes the device address and register address in addition to the data.

TABLE 3

| | Next Page Bits | |
|---|---|---|
| | 26:16 | 8:0 |
| OUI Read Response 1 | 18:16 Device Address 23:19 Reserved | 7:0 MMD 8 Reserved |

TABLE 3-continued

| | Next Page Bits | |
|---|---|---|
| | 26:16 | 8:0 |
| OUI Read Response 2 | 23:16 MDIO Address (MSB) 26:25 Reserved | 7:0 MDIO Address (LSB) 8 Reserved |
| OUI Read Response 3 | 23:16 MDIO Data to be written (MSB) 26:25 Reserved | 7:0 MDIO Data to be written (LSB) 8 Reserved |

In OUI Read Response 1, bits 18:16 are used for the Device Address, and bits 7:0 are used for the MMD, while bits 23:19 and 8 are reserved. In OUI Read Response 2, bits 23:16 are used for the MSB of the MDIO Address and bits 7:0 are used for the LSB of the MDIO Address, while bits 26:25 and 8 are reserved. In OUI Read Response 3, bits 23:16 are bits 7:0 are respectively used for the MSB and LSB of the MDIO Data to be written, while bits 26:25 and 8 are reserved.

Exemplary Endpoint Device

Figure 4:
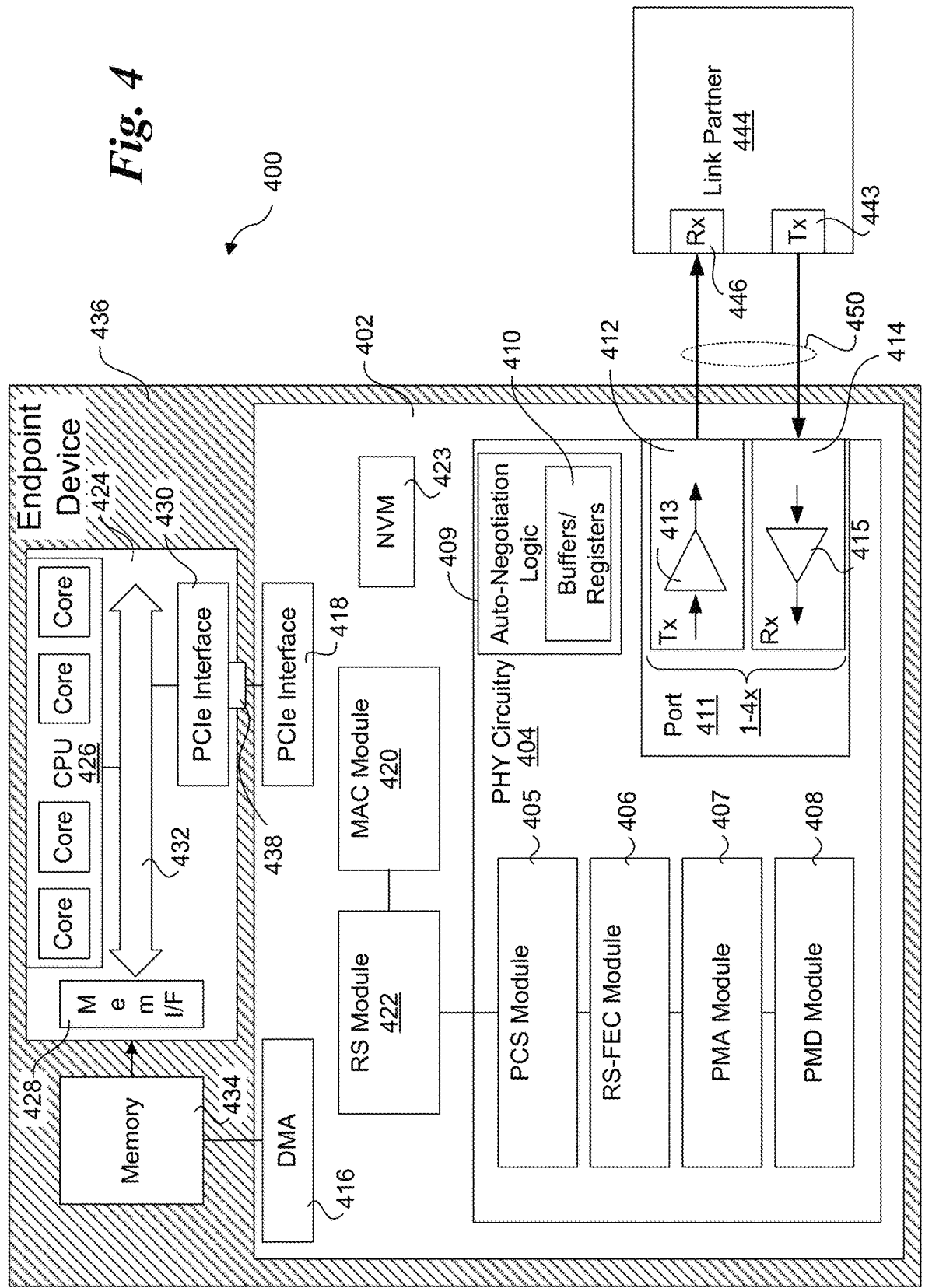
FIG. 4 is a block schematic architecture diagram for an endpoint device, according to one embodiment.

FIG. 4 shows an architecture for an endpoint device 400 employing a network chip 402 configured to perform link initialization including auto-negotiation operations in accordance with aspects of the embodiments disclosed herein. Network chip 402 comprises PHY (Physical Layer) circuitry 404 including a Physical Coding Sublayer (PCS) module 405, a Reed-Solomon Forward Error Correction (RS-FEC) module 406, a Physical Medium Attachment (PMA) module 407, a PMD module 408, an Auto-Negotiation module 409 including Buffer and/or registers 410, a network port 411 including a transmitter (Tx) 412 having transmitter circuitry 413 and a receiver (Rx) 414 having receiver circuitry 415. Depending on the PHY that is implemented, network port 411 will be configured to employ 1-4 lanes, wherein each lane includes a respective transmitter 412 and receiver 414.

Network chip 402 further includes a DMA (Direct Memory Access) interface 416, a Peripheral Component Interconnect Express (PCIe) interface 418, a MAC (Media Access Channel) module 420 and a Reconciliation Sublayer (RS) module 422. Endpoint device 400 also comprises a System on a Chip (SoC) 424 including a Central Processing Unit (CPU) 426 having one or more processor cores, coupled to a memory interface 428 and a PCIe interface 430 via an interconnect 432. Memory interface 428 is further depicted as being coupled to memory 434. Under a typical configuration, network chip 402, SoC 424 and memory 434 will be mounted on or otherwise operatively coupled to a circuit board 436 that includes wiring traces for coupling these components in communication, as depicted by single lines connecting DMA 416 to memory 434 and PCIe interface 418 to PCIe interface 430 at a PCIe port 438. As an optional configuration, the components depicted for SoC 424 and network chip 402 may be combined on an SoC, a multi-chip module, or a device having similar device packaging.

In one embodiment, MAC module 420 is configured to implement aspects of the MAC layer operations performed that are well-known in the art. Similar, RS module 422 is configured to implement reconciliation sub-layer operations.

During link initialization operations, embedded logic in Auto-Negotiation module 409 is implemented to perform the auto-negotiation operations of the endpoint devices, as depicted in FIGS. 1, 2a, 2b, and 3, as discussed above. During link initialization and during subsequent data transfer operations, data is exchanged between PHY transmit and receive ports 412 and 414 of endpoint device 400 and its link partner, as depicted by a link partner 444 including a receiver port 446 and a transmitter port 448 and are linked in communication via an Ethernet link 450. In one embodiment link partner 444 comprises an intermediate device having a configuration shown in FIG. 5.

Under various embodiments, network chip 402 comprises one of a 25 Gb/s Ethernet Network Interface Controller (NIC) chip employing a 25 GBASE-KR PHY or a 25 GBASE-CR PHY, or a 100 Gb/s Ethernet NIC chip employs a 100 GBASE-KR PY or a 100 GBASE-CR PHY. More generally, network chip 402 comprises interfaces with signaling rates such as and not limited to 25 Gb/s, 50 Gb/s or 100 Gb/s and beyond using any existing or future protocol. However, the circuitry and components of network chip 402 may also be implemented in other types of chips and components, including SoCs, multi-chip modules, and NIC chips including support for multiple network interfaces (e.g., wired and wireless). In addition, other PHYs and associated protocols may implemented in addition to Ethernet, such as but not limited to PHYs for PCIe links and InfiniB and links.

Exemplary Intermediate Device

Figure 5:
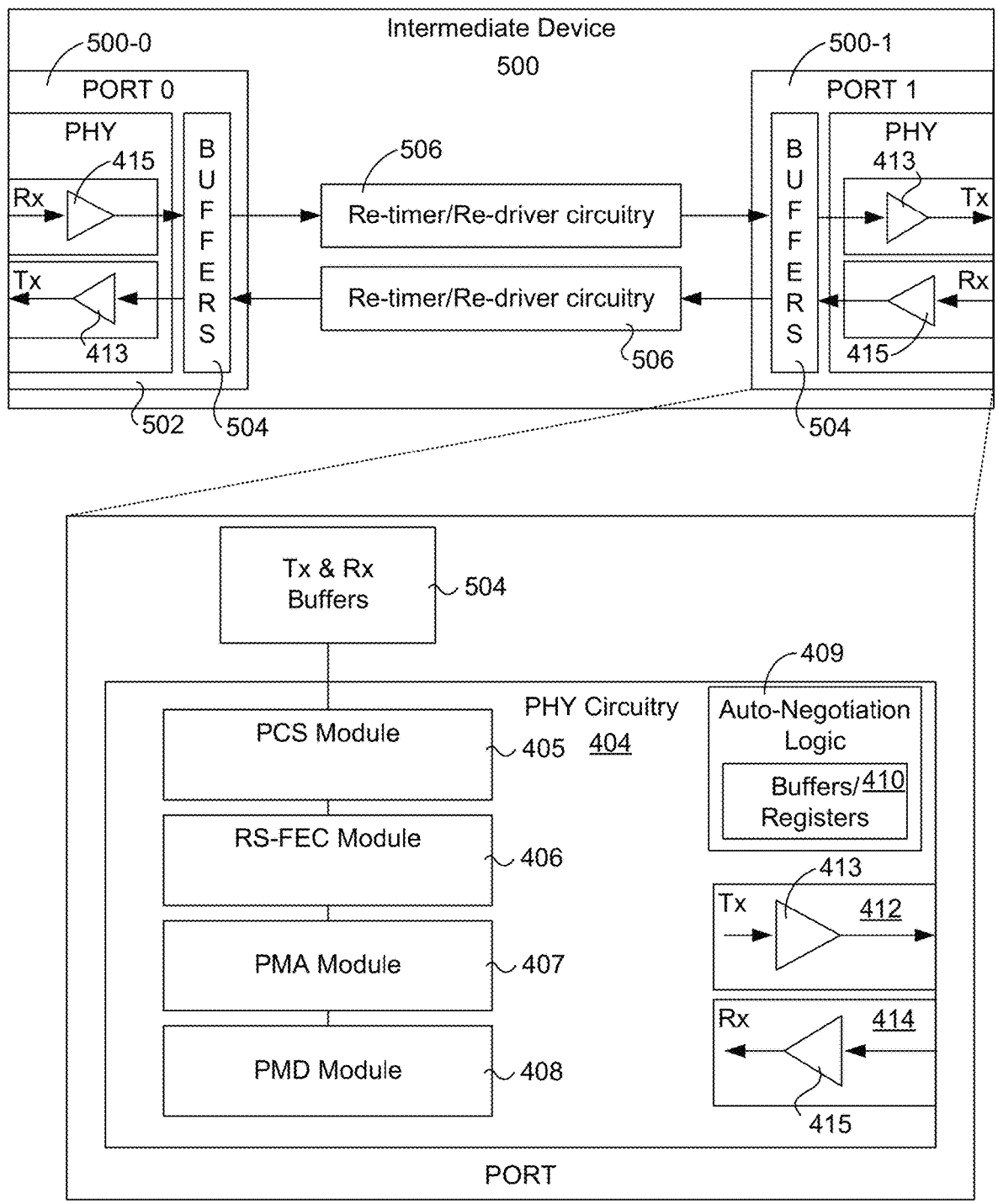
FIG. 5 is a block schematic architecture diagram for an intermediate device, according to one embodiment.

FIG. 5 shows an architecture for an intermediate device 500 configured to implement aspects of the method operations described herein. Intermediate device 500 includes a pair of ports 500-0 and 500-1 (Port 0 and Port 1), each having PHY circuitry 404 similar to that shown in FIG. 4 and described above. As before, PHY circuitry 404 includes a Tx and Rx ports 412 and 414, each of which is coupled to an Rx port and Tx port of an upstream or downstream device (as applicable). Presuming an ordering from left to right, when implemented in a serial chain, Port 0 is connected to an upstream device, while Port 1 is connected to a downstream device. Each of Ports 0 and 1 includes Tx and Rx buffers 504.

A primary function of an intermediate (buffer) device is signal re-timing and re-driving. These functions are performed by re-timer/re-driver circuitry blocks 506 (one block for each direction), as shown. The particular re-timer and re-driver circuits will depend on the PHY being used for the serial chain. Generally, re-timer circuitry is configured to correct timing errors in the received signal, and may typically employ well-known circuitry for this purpose, such as phase lock loops. Re-driver circuitry may typically include one or more amplifier circuits, as well as various types of well-known signal-conditioning circuitry used to increase the drive level of a received signal. Such re-timer and re-driver circuitry is well-known to those skilled in the high-speed interconnect arts, and, accordingly, no further details are shown or discussed herein.

Exemplary Communication Link Structures

Figure 6:
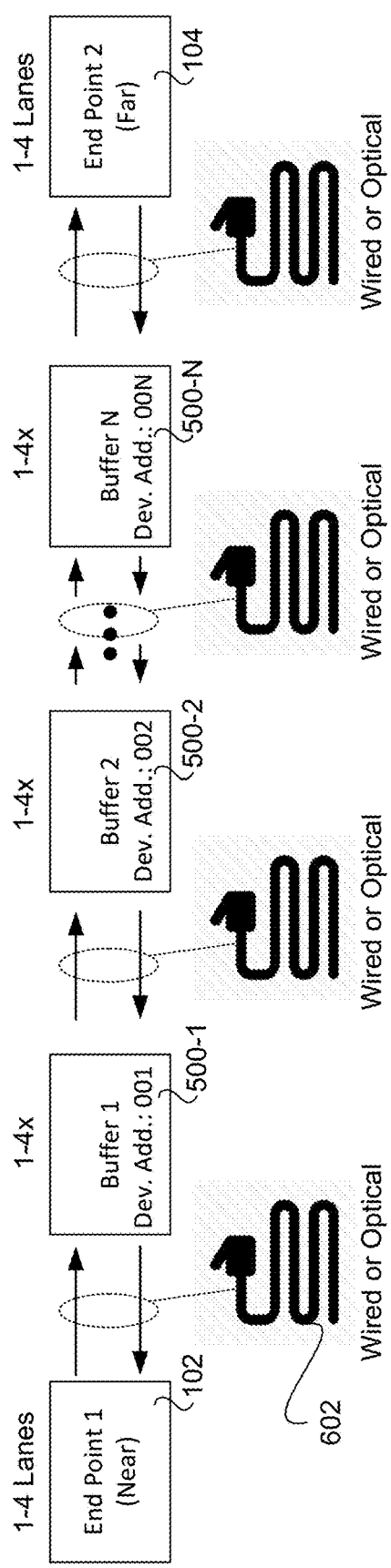
FIG. 6 is a schematic diagram illustrating a communication link between a pair of endpoint devices using a serial chain of signal buffering devices connected via wired or optical cables.

Examples of communication link structures linking a pair of endpoints in communication via a serial chain of signal buffering devices are shown in FIGS. 6, 7 and 8a-8c. For example, FIG. 6 shows a communication link 600 coupling a pair of endpoint devices 102 and 104 in communication using a serial chain of signal buffering devices 500-1 . . . 500-N connected via wired or optical cables 602. Generally, a given high-speed Ethernet link will employ 1-4 lanes in each direction. For example, Ethernet links employing a 25 GBASE-KR PHY or a 25 GBASE-CR PHY use a single lane in each direction, while Ethernet links employing a 100 GBASE-KR PHY or a 100 GBASE-CR PHY use four lanes in each direction. Under alternative embodiments, as illustrated by exemplary printed circuit board (PCB) implementations in FIGS. 8a and 8b, a multi-lane link may include a respective signal buffering device for each lane, or a single signal buffering device may be configured to buffer signals for multiple lanes. For single-lane signal buffering devices, a separate cable will be connected at each end of the device. Signal buffering devices supporting multiple lanes may be connected using one or more cables between pairs of devices.

Figure 7:
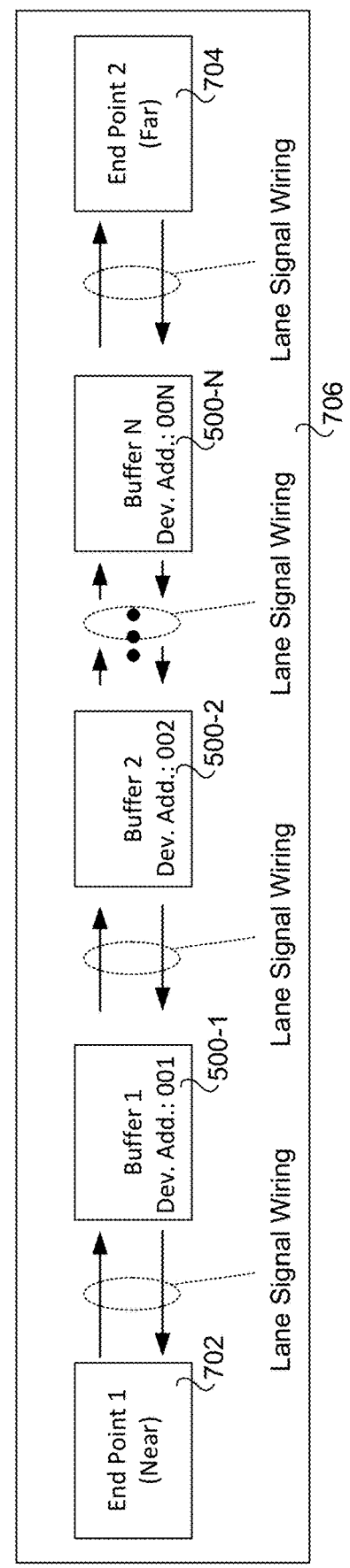
FIG. 7 is a schematic diagram of a communication link between a pair of endpoint devices mounted on a printed circuit board (PCB) including a serial chain of signal buffering devices mounted on the PCB.

FIG. 7 shows a communication link 700 between a pair of endpoint devices 702 and 704 mounted on a printed circuit board (PCB) 706 that includes a serial chain of signal buffering devices signal buffering devices 500-1 . . . 500-N mounted on the PCB. Communication link 700 employs a single lane in each direction, and will include a corresponding set of lane signal wiring coupled between each pair of devices in the serial chain of devices.

Figure 8A:
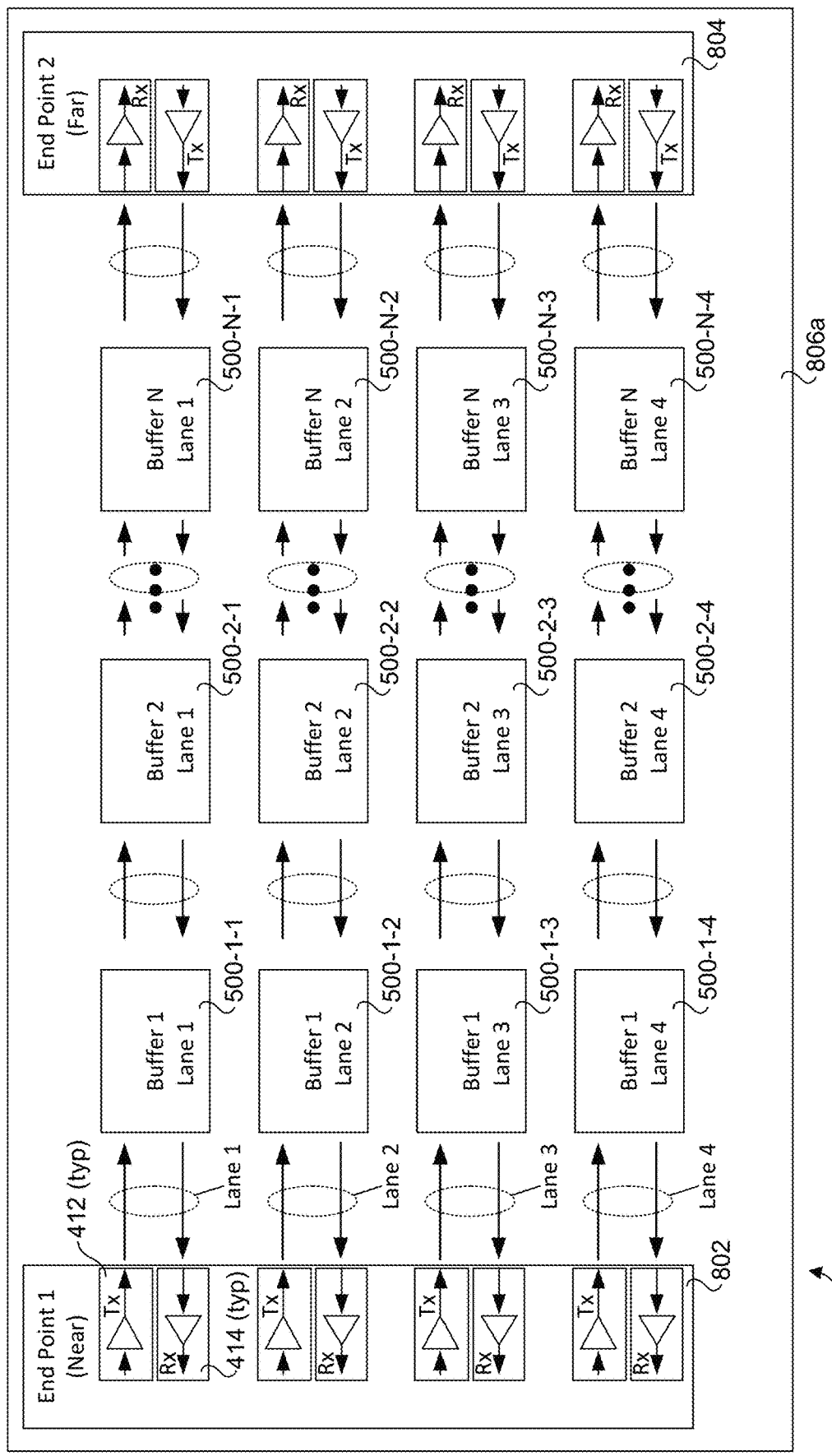
FIG. 8a is a schematic diagram of a multi-lane communication link between a pair of endpoint devices mounted on a PCB, wherein each lane included a serial chain of signal buffering devices mounted on the PCB.

FIG. 8a shows an embodiment of a multi-lane communication link 800a coupling a pair of endpoint devices 802 and 804 mounted on a PCB 806a in communication, wherein each of four lanes includes a respective serial chain of signal buffering devices 500 mounted on the PCB. In FIG. 7a, each of the signal buffering devices is labeled 500-i-k, where i is the buffer number and k is the lane number. As further illustrated, each of endpoint devices 702 and 704 include four pairs of transmitters 412 and receivers 414, one for each lane in each direction.

Figure 8B:
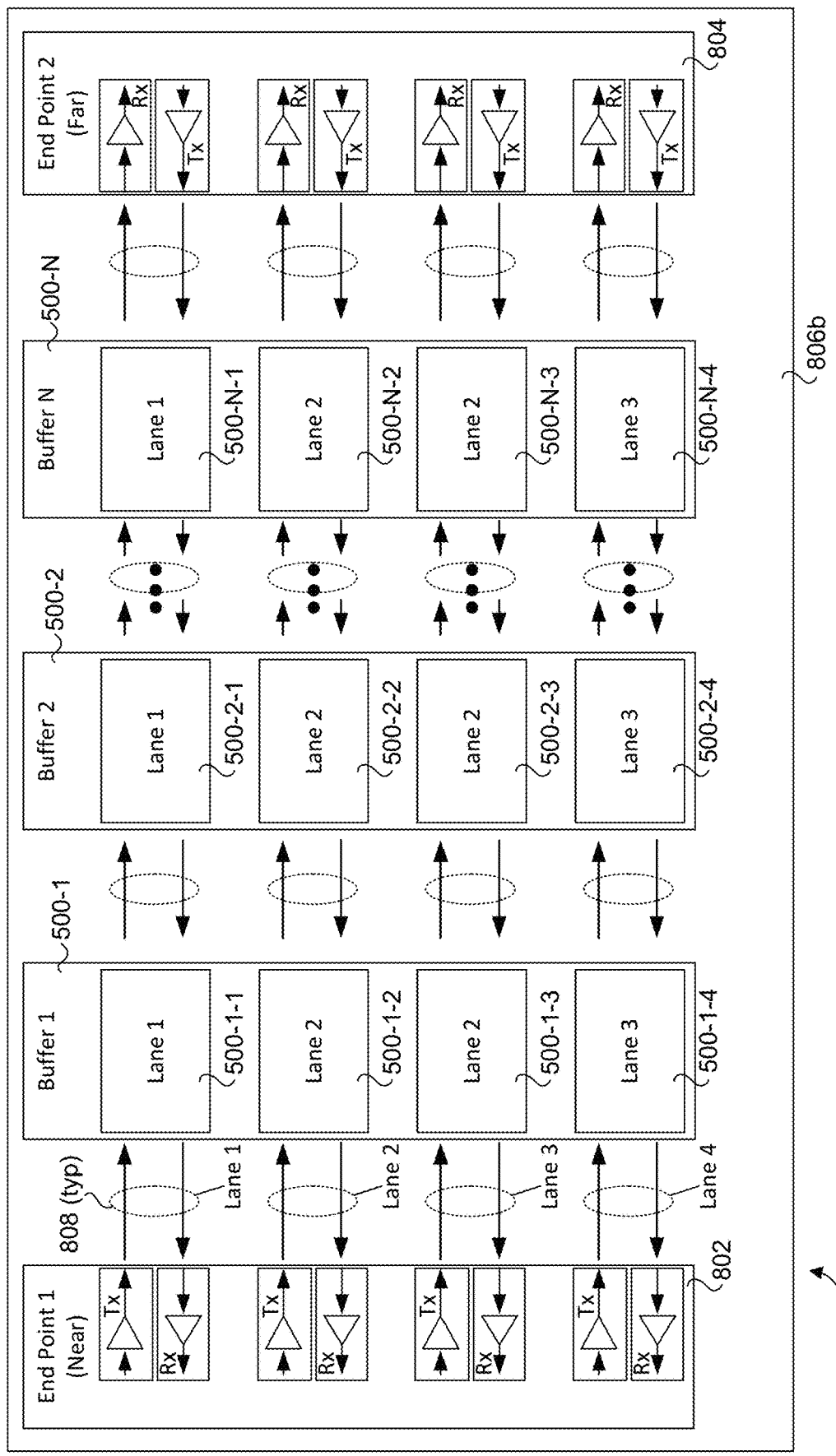
FIG. 8b is a schematic diagram of a multi-lane communication link between a pair of endpoint devices mounted on a PCB, wherein each signal buffering device supports communication over multiple lanes.

FIG. 8b shows a multi-lane communication link 800b coupling a pair of endpoint devices 802 and 804 mounted on a PCB 806b in communication, and including N signal buffering devices 500-1 . . . 500-N that are serially-connected forming a serial chain of devices. Each of the signal buffering devices 500-1 . . . 500-N supports signal buffering functionality for four lanes, wherein the signal buffering circuitry for each lane is similar to that included in the individual lane signal buffering devices of FIGS. 5-7 and 8a. In addition PCB 806b includes a respective set of wiring 808 to support communication for each direction for each of the four lanes.

Figure 8C:
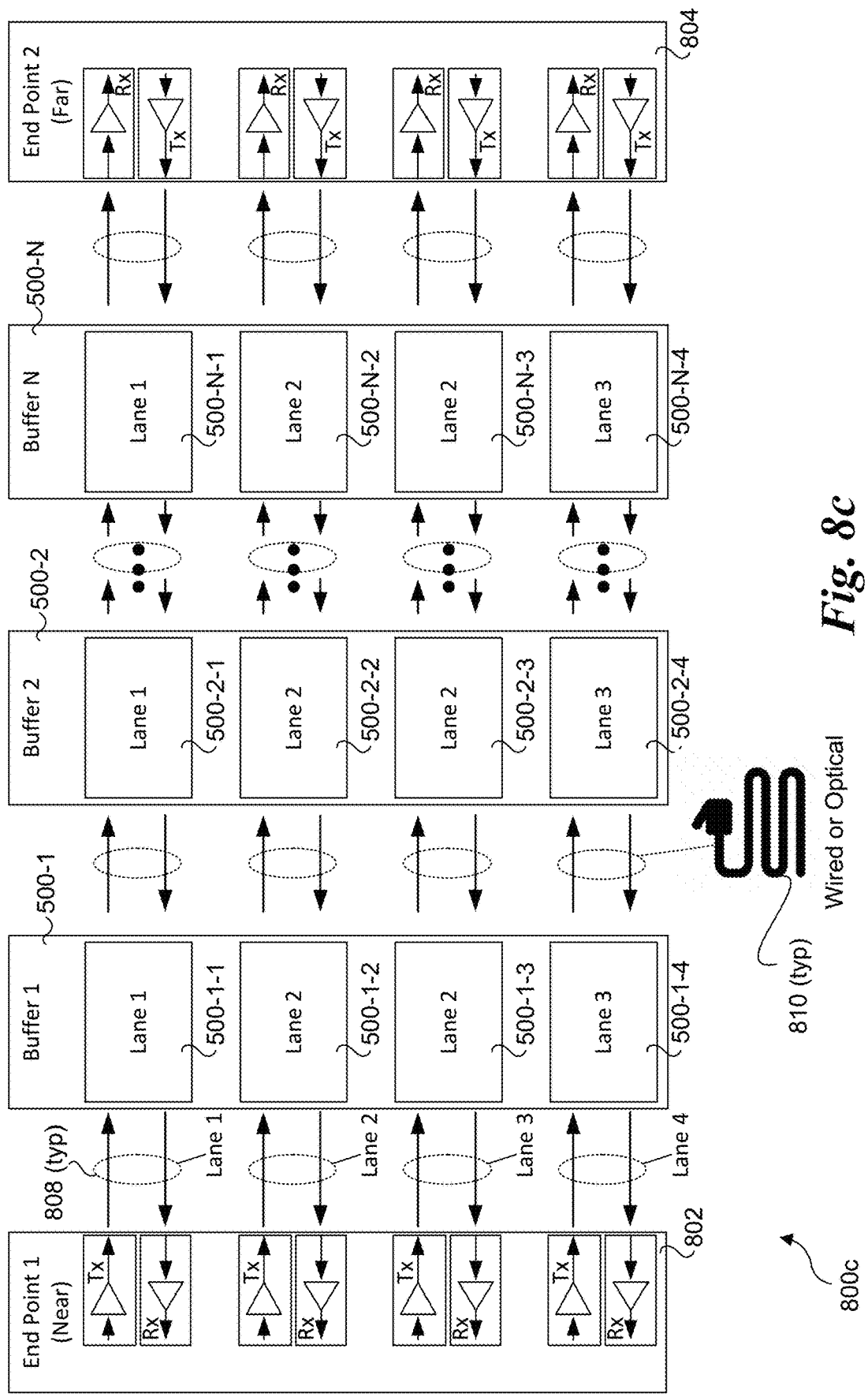
FIG. 8c is a schematic diagram of a multi-lane communication link between a pair of endpoint devices and signal buffering device connected to form a serial chain of devices using multiple wired or optical cables.

FIG. 8c shows a multi-lane communication link 800c coupling a pair of endpoint devices 802 and 804 in communication via N signal buffering devices 500-1 . . . 500-N that are serially-connected forming a serial chain of devices. Under multi-lane communication link 800c, each pair of devices in the serial chain of devices is connected by four wired or optical cables 810.

Under a multi-lane implementation that employs signal buffering devices that support multiple lanes, such as shown in FIGS. 8b and 8c, discovery and configuration of the signal buffering devices 500-1 . . . 500-N is enabled through use of the techniques described above for a signal-lane link implemented using in-band signaling on one of the multiple lanes. Subsequently, link training would be implemented for each of the multiple lanes separately in accordance with the applicable link training process defined by the specification for that particular type of multi-lane communication link.

Once the intermediate devices have been configured, specific registers in each intermediate device can be written to or read from using the Write and Read AN Next Page sequences described above. For example, a specific register may be identified by the combination of the device address for the target intermediate device (to be written to or read from), and an MDIO address of a register on that intermediate device.

Further aspects of the subject matter described herein are set out in the following numbered clauses:

1. A computer-implemented method, comprising, employing a first sequence of Auto-Negotiation (AN) Next Pages to write data to a register in an intermediate device from among a plurality of serially-connected intermediate devices in a communication link between first and second endpoint devices including the plurality of serially-connected intermediate devices; and employing a second sequence of AN Next Pages to read data from the register in the intermediate device.

2. The computer-implemented method of clause 1, wherein the first sequence of AN Next Pages to write data to the register in the intermediate device comprise:

a first Next Page including a device address of the intermediate device;

a second Next Page including an Management Data Input/Output (MDIO) address corresponding with a register on the intermediate device to which Write data is to be written; and a third Next Page including data to be written to the register at the MDIO address.

3. The computer-implemented method of clause 2, wherein each of the first, second, and third Next Pages respectively include one or more Next Page bits that are used to identify that Next Page as a first, second, or third Next Page in a register Write sequence.

4. The computer-implemented method of clause 2 or 3, wherein the first sequence of AN Next Pages is sent from a link partner with the intermediate device, further comprising setting a first Acknowledgement (Ack) bit in a Next Page sent to the link partner in response to receiving the third Next Page.

5. The computer-implemented method of clause 4, further comprising setting a second Acknowledgement (Ack2) bit in a Next Page sent to the link partner in response to completing writing data to the register.

6. The computer-implemented method of any of the preceding clauses, wherein the second sequence of AN Next Pages to read data from the register in the intermediate device comprise:

a first Next Page including a device address of the intermediate device; and a second Next Page including an Management Data Input/Output (MDIO) address corresponding to a register on the intermediate device from which data is to be read.

7. The computer-implemented method of clause 6, wherein each of the first and second Next Pages respectively include one or more Next Page bits that are used to identify that Next Page as a first or second Next Page in a register Read sequence.

8. The computer-implemented method of any of the preceding clauses, wherein the first and second sequences of AN Next Pages comprise AN Next Pages in compliance with Institute of Electrical and Electronics Engineers (IEEE) 802.3 clause 73.

9. The computer-implemented method of clause 8, wherein the first and second sequences of AN Next Pages include AN Next Pages that employ Management Data Input/Output (MDIO) addressing in accordance with IEEE 802.3 Clause 45.

10. An apparatus, comprising:

a network port, including a transmitter and a receiver; and circuitry and logic that is configured, when the apparatus is implemented as a first endpoint device in a communication link between the apparatus and a second endpoint device, the communication link including a plurality of serially-connected intermediate devices comprising intermediate devices in a serial chain of devices including the apparatus and the second endpoint device, to, transmit a first sequence of Auto-Negotiation (AN) Next Pages to write data to a register in an intermediate device from among the plurality of serially-connected intermediate devices; and transmit a second sequence of AN Next Pages to read data from the register in the intermediate device.

11. The apparatus of clause 10, wherein the first sequence of AN Next Pages to write data to the register in the intermediate device comprise:

a first Next Page including a device address of the intermediate device;

a second Next Page including an Management Data Input/Output (MDIO) address corresponding with a register on the intermediate device to which Write data is to be written; and a third Next Page including data to be written to the register at the MDIO address.

12. The apparatus of clause 11, wherein each of the first, second, and third Next Pages respectively include one or more Next Page bits that are used to identify that Next Page as a first, second, or third Next Page in a register Write sequence.

13. The apparatus of any of clauses 10-12, wherein the second sequence of AN Next Pages to read data from the register in the intermediate device comprise:

a first Next Page including a device address of the intermediate device; and a second Next Page including an Management Data Input/Output (MDIO) address corresponding to a register on the intermediate device from which data is to be read.

14. The apparatus of clause 13, wherein each of the first and second Next Pages respectively include one or more Next Page bits that are used to identify that Next Page as a first or second Next Page in a register Read sequence.

15. The apparatus of any of clauses 10-14, wherein the apparatus comprises an Ethernet Network Interface Controller (NIC), and wherein the first and second sequences of AN Next Pages comprise AN Next Pages in compliance with Institute of Electrical and Electronics Engineers (IEEE) 802.3 clause 73.

16. The apparatus of clause 15, wherein the first and second sequences of AN Next Pages include AN Next Pages that employ Management Data Input/Output (MDIO) addressing in accordance with IEEE 802.3 Clause 45.

17. An apparatus comprising a signal buffering device, including:

a first port having a first transmitter and a first receiver coupled to a first plurality of buffers;

a second port having a second transmitter and a second receiver coupled to a second plurality of buffers;

one or more registers; and circuitry and logic that is configured, when that apparatus is implemented as an intermediate device in a communication link between first and second endpoints including a plurality of serially-connected signal buffering devices, each comprising an intermediate device in a serial chain of devices, to, receive a first sequence of Auto-Negotiation (AN) Next Pages transmitted from the first endpoint to write data to a first register from among the one or more registers;

write the data to the first register; and receive a second sequence of AN Next Pages to read data from the first register; and read the data from the first register.

18. The apparatus of clause 17, wherein the first sequence of AN Next Pages to write data to the register in the intermediate device comprise:

a first Next Page including a device address of the apparatus;

a second Next Page including a Management Data Input/Output (MDIO) address of a register to which the data is to be written, the register corresponding to the first register; and a third Next Page including data to be written to the register at the MDIO address.

19. The apparatus of clause 18, wherein each of the first, second, and third Next Pages respectively include one or more Next Page bits that are used to identify that Next Page as a first, second, or third Next Page in a register Write sequence.

20. The apparatus of clause 18 or 19, wherein the apparatus is further configured to set a first Acknowledgement (Ack) bit in a Next Page sent to the first endpoint in response to receiving the third Next Page.

21. The apparatus of clause 20, wherein the apparatus is further configured to set a second Acknowledgement (Ack2) bit in a Next Page sent to the first endpoint in response to completing writing data to the first register.

22. The apparatus of any of clauses 17-21, wherein the second sequence of AN Next Pages to read data from the first register comprise:

a first Next Page including a device address of the apparatus; and a second Next Page including an Management Data Input/Output (MDIO) address corresponding to a register on the apparatus from which data is to be read, wherein the MDIO address corresponds to the first register.

23. The apparatus of clause 22, wherein each of the first and second Next Pages respectively include one or more Next Page bits that are used to identify that Next Page as a first or second Next Page in a register Read sequence.

24. The apparatus of any of clauses 17-21, wherein the first and second sequences of AN Next Pages comprise AN Next Pages in compliance with Institute of Electrical and Electronics Engineers (IEEE) 802.3 clause 73.

25. The apparatus of clause 24, wherein the first and second sequences of AN Next Pages include AN Next Pages that employ Management Data Input/Output (MDIO) addressing in accordance with IEEE 802.3 Clause 45.

26. A system comprising:

first and second endpoint devices, each endpoint device including, a network port including a transmitter and a receiver;

a plurality of serially-connected signal buffering devices, each signal buffering device including, a first port having a first transmitter and a first receiver coupled to a first plurality of buffers; and a second port having a second transmitter and a second receiver coupled to a second plurality of buffers, wherein the first endpoint device is connected to a first signal buffering device among the plurality of signal buffering devices, and an Nth signal buffering device among the plurality of signal buffering devices is connected to the second endpoint device to form a communication link comprising a serial chain of devices including N signal buffering devices, and wherein the first and second endpoint devices and the plurality of signal buffering devices are configured to, employ first sets of Ethernet Auto Negotiation (AN) Next Pages to write data to selected registers on a selected signal buffering devices; and employ second sets of Ethernet AN Next Pages to read data from selected registers on a selected signal buffering devices; and 27. The system of clause 26, wherein the first endpoint device is configured to:

transmit a Write sequence of AN Next Pages to write data to a register in a signal buffering device from among the plurality of signal buffering devices, wherein the Write sequence comprises first, second, and third Next Pages; and wherein each of the plurality of signal buffering devices is configured to, one of be configured with a device address or generate a device address for itself;

receive AN Next Pages transmitted from the first endpoint device;

determine if an AN Next Page that is received includes an address corresponding to the device address for the signal buffering device, and if so, determine if the AN Next Page is a first Next Page in a Write sequence, and if so, receive a second Next Page in the Write sequence sent from the first endpoint containing a Management Data Input/Output (MDIO) address for a register to which data is to be written;

receive a third Next Page in the Write sequence sent from the first endpoint containing data to be written; and write the data to the register identified by the MDIO address in the second Next Page in the Write sequence;

otherwise, if an AN Next Page that is received includes an address that does not correspond to the device address for the signal buffer device, forwarding the AN Next Page to a next device of the plurality of serially-connected signal buffering devices or forwarding the AN Next Page to the second endpoint device.

28. The system of clause 27, wherein each of the plurality of signal buffering devices is configured to set a first Acknowledgement (Ack) bit in a Next Page sent to the first endpoint in response to receiving the third Next Page of a Write sequence that includes a first Next Page having a device address corresponding to that signal buffering device.

29. The system of any of clauses 26-28, wherein the first endpoint device is configured to:

transmit a Read sequence of AN Next Pages to read data from a register in a signal buffering device from among the plurality of signal buffering devices, wherein the Read sequence comprises first and second Next Pages; and wherein each of the plurality of signal buffering devices is configured to, one of be configured with a device address or generate a device address for itself;

receive AN Next Pages transmitted from the first endpoint device:

determine if an AN Next Page that is received includes an address corresponding to the device address for the signal buffering device, and if so, determine if the AN Next Page is a first Next Page in a Read sequence, and if so, receive a second Next Page in the Read sequence sent from the first endpoint containing a Management Data Input/Output (MDIO) address for a register from which data is to be read;

receive a third Next Page in the Write sequence sent from the first endpoint containing data to be written;

read the data from the register identified by the MDIO address in the second Next Page in the Write sequence; and return the data that is read from the register to the first endpoint device.

otherwise, if an AN Next Page that is received includes an address that does not correspond to the device address for the signal buffer device, forwarding the AN Next Page to a next device of the plurality of serially-connected signal buffering devices or forwarding the AN Next Page to the second endpoint device.

30. The system of any of clauses 26-29, wherein the communication link employs one of an IEEE 802.3 25 GBASE-KR Physical Layer (PHY), a 25 GBASE-CR PHY, a 100 GBASE-KR PHY or a 100 GBASE-CR PHY.

31. The system of any of clauses 26-30, wherein the first and second sequences of AN Next Pages comprise AN Next Pages in compliance with Institute of Electrical and Electronics Engineers (IEEE) 802.3 clause 73.

32. The apparatus of clause 31, wherein the first and second sequences of AN Next Pages include AN Next Pages that employ Management Data Input/Output (MDIO) addressing in accordance with IEEE 802.3 Clause 45.

33. An apparatus, configured to be implemented as a first endpoint device in a communication link between the apparatus and a second endpoint device, the communication link including a plurality of serially-connected intermediate devices comprising intermediate devices in a serial chain of devices including the apparatus and the second endpoint device, comprising:

a network port, including a transmitter and a receiver; and means for, transmitting a first sequence of Auto-Negotiation (AN) Next Pages to write data to a register in an intermediate device from among the plurality of serially-connected intermediate devices; and transmitting a second sequence of AN Next Pages to read data from the register in the intermediate device.

34. The apparatus of clause 33, wherein the first sequence of AN Next Pages to write data to the register in the intermediate device comprise:

a first Next Page including a device address of the intermediate device;

a second Next Page including an Management Data Input/Output (MDIO) address corresponding with a register on the intermediate device to which Write data is to be written; and a third Next Page including data to be written to the register at the MDIO address.

35. The apparatus of clause 34, wherein each of the first, second, and third Next Pages respectively include one or more Next Page bits that are used to identify that Next Page as a first, second, or third Next Page in a register Write sequence.

36. The apparatus of any of clauses 33-35, wherein the second sequence of AN Next Pages to read data from the register in the intermediate device comprise:

a first Next Page including a device address of the intermediate device; and a second Next Page including an Management Data Input/Output (MDIO) address corresponding to a register on the intermediate device from which data is to be read.

37. The apparatus of clause 36, wherein each of the first and second Next Pages respectively include one or more Next Page bits that are used to identify that Next Page as a first or second Next Page in a register Read sequence.

38. The apparatus of any of clauses 33-37, wherein the apparatus comprises an Ethernet Network Interface Controller (NIC), and wherein the first and second sequences of AN Next Pages comprise AN Next Pages in compliance with Institute of Electrical and Electronics Engineers (IEEE) 802.3 clause 73.

39. The apparatus of clause 38, wherein the first and second sequences of AN Next Pages include AN Next Pages that employ Management Data Input/Output (MDIO) addressing in accordance with IEEE 802.3 Clause 45.

40. An apparatus comprising a signal buffering device, configured to be implemented as an intermediate device in a communication link between first and second endpoints including a plurality of serially-connected signal buffering devices, each comprising an intermediate device in a serial chain of devices, the apparatus including:

a first port having a first transmitter and a first receiver coupled to a first plurality of buffers;

a second port having a second transmitter and a second receiver coupled to a second plurality of buffers;

one or more registers; and means for, receiving a first sequence of Auto-Negotiation (AN) Next Pages transmitted from the first endpoint to write data to a first register from among the one or more registers;

writing the data to the first register; and receiving a second sequence of AN Next Pages to read data from the first register; and reading the data from the first register.

41. The apparatus of clause 40, wherein the first sequence of AN Next Pages to write data to the register in the intermediate device comprise:

a first Next Page including a device address of the apparatus;

a second Next Page including a Management Data Input/Output (MDIO) address of a register to which the data is to be written, the register corresponding to the first register; and a third Next Page including data to be written to the register at the MDIO address.

42. The apparatus of clause 41, wherein each of the first, second, and third Next Pages respectively include one or more Next Page bits that are used to identify that Next Page as a first, second, or third Next Page in a register Write sequence.

43. The apparatus of clause 41 or 42, further comprising means for setting a first Acknowledgement (Ack) bit in a Next Page sent to the first endpoint in response to receiving the third Next Page.

44. The apparatus of clause 43, further comprising means for setting a second Acknowledgement (Ack2) bit in a Next Page sent to the first endpoint in response to completing writing data to the first register.

45. The apparatus of any of clauses 40-44, wherein the second sequence of AN Next Pages to read data from the first register comprise:

a first Next Page including a device address of the apparatus; and a second Next Page including an Management Data Input/Output (MDIO) address corresponding to a register on the apparatus from which data is to be read, wherein the MDIO address corresponds to the first register.

46. The apparatus of clause 45, wherein each of the first and second Next Pages respectively include one or more Next Page bits that are used to identify that Next Page as a first or second Next Page in a register Read sequence.

47. The apparatus of any of clauses 40-46, wherein the first and second sequences of AN Next Pages comprise AN Next Pages in compliance with Institute of Electrical and Electronics Engineers (IEEE) 802.3 clause 73.

48. The apparatus of clause 47, wherein the first and second sequences of AN Next Pages include AN Next Pages that employ Management Data Input/Output (MDIO) addressing in accordance with IEEE 802.3 Clause 45.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Letters such as 'N' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A computer-implemented method, comprising:
   exchanging Auto-Negotiation (AN) Base Pages between a first endpoint device and a second endpoint device in a communication link having a plurality of serially-connected intermediate devices coupled between the first and second endpoint devices;
   employing a first sequence of AN Next Pages to write data to a register in an intermediate device from among a plurality of serially-connected intermediate devices; and
   employing a second sequence of AN Next Pages to read data from the register in the intermediate device.

2. The computer-implemented method of claim 1, wherein the first sequence of AN Next Pages to write data to the register in the intermediate device comprise:
   a first Next Page including a device address of the intermediate device;
   a second Next Page including a Management Data Input/Output (MDIO) address corresponding with a register on the intermediate device to which Write data is to be written; and
   a third Next Page including data to be written to the register at the MDIO address.

3. The computer-implemented method of claim 2, wherein each of the first, second, and third Next Pages respectively include one or more Next Page bits that are used to identify that Next Page as a first, second, or third Next Page in a register Write sequence.

4. The computer-implemented method of claim 2, wherein the first sequence of AN Next Pages is sent from a link partner with the intermediate device, further comprising setting a first Acknowledgement (Ack) bit in a Next Page sent to the link partner in response to receiving the third Next Page.

5. The computer-implemented method of claim 4, further comprising setting a second Acknowledgement (Ack2) bit in a Next Page sent to the link partner in response to completing writing data to the register.

6. The computer-implemented method of claim 1, wherein the second sequence of AN Next Pages to read data from the register in the intermediate device comprise:
   a first Next Page including a device address of the intermediate device; and
   a second Next Page including a Management Data Input/Output (MDIO) address corresponding to a register on the intermediate device from which data is to be read.

7. The computer-implemented method of claim 6, wherein each of the first and second Next Pages respectively include one or more Next Page bits that are used to identify that Next Page as a first or second Next Page in a register Read sequence.

8. The computer-implemented method of claim 1, wherein the first and second sequences of AN Next Pages comprise AN Next Pages in compliance with Institute of Electrical and Electronics Engineers (IEEE) 802.3 clause 73.

9. The computer-implemented method of claim 8, wherein the first and second sequences of AN Next Pages include AN Next Pages that employ Management Data Input/Output (MDIO) addressing in accordance with IEEE 802.3 Clause 45.

10. An apparatus, comprising:
    a network port, including a transmitter and a receiver; and
    circuitry and logic that is configured, when the apparatus is implemented as a first endpoint device in a communication link between the apparatus and a second endpoint device, the communication link including a plurality of serially-connected intermediate devices comprising intermediate devices in a serial chain of devices including the apparatus and the second endpoint device, to,
       exchange Auto-Negotiation (AN) Base Pages with the second endpoint device;
       transmit a first sequence of Auto-Negotiation (AN) Next Pages to write data to a register in an intermediate device from among the plurality of serially-connected intermediate devices; and
       transmit a second sequence of AN Next Pages to read data from the register in the intermediate device.

11. The apparatus of claim 10, wherein the first sequence of AN Next Pages to write data to the register in the intermediate device comprise:
    a first Next Page including a device address of the intermediate device;
    a second Next Page including a Management Data Input/Output (MDIO) address corresponding with a register on the intermediate device to which Write data is to be written; and
    a third Next Page including data to be written to the register at the MDIO address.

12. The apparatus of claim 11, wherein each of the first, second, and third Next Pages respectively include one or more Next Page bits that are used to identify that Next Page as a first, second, or third Next Page in a register Write sequence.

13. The apparatus of claim 10, wherein the second sequence of AN Next Pages to read data from the register in the intermediate device comprise:
    a first Next Page including a device address of the intermediate device; and
    a second Next Page including a Management Data Input/Output (MDIO) address corresponding to a register on the intermediate device from which data is to be read.

14. The apparatus of claim 13, wherein each of the first and second Next Pages respectively include one or more Next Page bits that are used to identify that Next Page as a first or second Next Page in a register Read sequence.

15. The apparatus of claim 10, wherein the apparatus comprises an Ethernet Network Interface Controller (NIC), and wherein the first and second sequences of AN Next Pages comprise AN Next Pages in compliance with Institute of Electrical and Electronics Engineers (IEEE) 802.3 clause 73.

16. The apparatus of claim 15, wherein the first and second sequences of AN Next Pages include AN Next Pages that employ Management Data Input/Output (MDIO) addressing in accordance with IEEE 802.3 Clause 45.

17. An apparatus comprising a signal buffering device, including:
    a first port having a first transmitter and a first receiver coupled to a first plurality of buffers;
    a second port having a second transmitter and a second receiver coupled to a second plurality of buffers;

one or more registers; and circuitry and logic that is configured, when that apparatus is implemented as an intermediate device in a communication link between first and second endpoints including a plurality of serially-connected signal buffering devices, each comprising an intermediate device in a serial chain of devices, to, forward Auto-Negotiation (AN) Base Pages transmitted over the communication link between the first and second endpoints;

receive a first sequence of AN Next Pages transmitted from the first endpoint to write data to a first register from among the one or more registers;

write the data to the first register; and receive a second sequence of AN Next Pages to read data from the first register; and read the data from the first register.

18. The apparatus of claim 17, wherein the first sequence of AN Next Pages to write data to the first register in the intermediate device comprise:

a first Next Page including a device address of the apparatus;

a second Next Page including a Management Data Input/Output (MDIO) address of a register to which the data is to be written, the register corresponding to the first register; and a third Next Page including data to be written to the register at the MDIO address.

19. The apparatus of claim 18, wherein each of the first, second, and third Next Pages respectively include one or more Next Page bits that are used to identify that Next Page as a first, second, or third Next Page in a register Write sequence.

20. The apparatus of claim 18, further comprising setting a first Acknowledgement (Ack) bit in a Next Page sent to the first endpoint in response to receiving the third Next Page.

21. The apparatus of claim 20, further comprising setting a second Acknowledgement (Ack2) bit in a Next Page sent to the first endpoint in response to completing writing data to the first register.

22. The apparatus of claim 17, wherein the second sequence of AN Next Pages to read data from the first register comprise:

a first Next Page including a device address of the apparatus; and a second Next Page including a Management Data Input/Output (MDIO) address corresponding to a register on the apparatus from which data is to be read, wherein the MDIO address corresponds to the first register.

23. The apparatus of claim 22, wherein each of the first and second Next Pages respectively include one or more Next Page bits that are used to identify that Next Page as a first or second Next Page in a register Read sequence.

24. The apparatus of claim 17, wherein the first and second sequences of AN Next Pages comprise AN Next Pages in compliance with Institute of Electrical and Electronics Engineers (IEEE) 802.3 clause 73.

25. The apparatus of claim 24, wherein the first and second sequences of AN Next Pages include AN Next Pages that employ Management Data Input/Output (MDIO) addressing in accordance with IEEE 802.3 Clause 45.

26. A system comprising:

first and second endpoint devices, each endpoint device including, a network port including a transmitter and a receiver;

a plurality of serially-connected signal buffering devices, each signal buffering device including, a first port having a first transmitter and a first receiver coupled to a first plurality of buffers; and a second port having a second transmitter and a second receiver coupled to a second plurality of buffers, wherein the first endpoint device is connected to a first signal buffering device among the plurality of signal buffering devices, and an Nth signal buffering device among the plurality of signal buffering devices is connected to the second endpoint device to form a communication link comprising a serial chain of devices including N signal buffering devices, and wherein the first and second endpoint devices and the plurality of signal buffering devices are configured to, exchange Ethernet Auto-Negotiation (AN) Base Pages between the first and second endpoint devices, the Ethernet AN Base Pages being forwarded by the N signal buffering devices;

employ first sets of Ethernet AN Next Pages to write data to selected registers on selected signal buffering devices; and employ second sets of Ethernet AN Next Pages to read data from selected registers on selected signal buffering devices.

27. The system of claim 26, wherein the first endpoint device is configured to:

transmit a Write sequence of AN Next Pages to write data to a register in a signal buffering device from among the plurality of signal buffering devices, wherein the Write sequence comprises first, second, and third Next Pages; and wherein each of the plurality of signal buffering devices is configured to, one of be configured with a device address or generate a device address for itself;

receive AN Next Pages transmitted from the first endpoint device;

determine if an AN Next Page that is received includes an address corresponding to the device address for the signal buffering device, and if so, determine if the AN Next Page is a first Next Page in a Write sequence, and if so, receive a second Next Page in the Write sequence sent from the first endpoint containing a Management Data Input/Output (MDIO) address for a register to which data is to be written;

receive a third Next Page in the Write sequence sent from the first endpoint containing data to be written; and write the data to the register identified by the MDIO address in the second Next Page in the Write sequence;

otherwise, if an AN Next Page that is received includes an address that does not correspond to the device address for the signal buffer device, forwarding the AN Next Page to a next device of the plurality of serially-connected signal buffering devices or forwarding the AN Next Page to the second endpoint device.

28. The system of claim 27, wherein each of the plurality of signal buffering devices is configured to set a first Acknowledgement (Ack) bit in a Next Page sent to the first endpoint in response to receiving the third Next Page of a Write sequence that includes a first Next Page having a device address corresponding to that signal buffering device.

29. The system of claim 26, wherein the first endpoint device is configured to:
  transmit a Read sequence of AN Next Pages to read data from a register in a signal buffering device from among the plurality of signal buffering devices, wherein the Read sequence comprises first and second Next Pages; and
  wherein each of the plurality of signal buffering devices is configured to,
    one of be configured with a device address or generate a device address for itself;
    receive AN Next Pages transmitted from the first endpoint device:
    determine if an AN Next Page that is received includes an address corresponding to the device address for the signal buffering device, and if so,
      determine if the AN Next Page is a first Next Page in a Read sequence, and if so,
        receive a second Next Page in the Read sequence sent from the first endpoint containing a Management Data Input/Output (MDIO) address for a register from which data is to be read;
        receive a third Next Page in the Write sequence sent from the first endpoint containing data to be written;
        read the data from the register identified by the MDIO address in the second Next Page in the Write sequence; and
        return the data that is read from the register to the first endpoint device
      otherwise, if an AN Next Page that is received includes an address that does not correspond to the device address for the signal buffer device, forwarding the AN Next Page to a next device of the plurality of serially-connected signal buffering devices or forwarding the AN Next Page to the second endpoint device.

30. The system of claim 26, wherein the communication link employs one of an IEEE 802.3 25 GBASE-KR Physical Layer (PHY), a 25 GBASE-CR PHY, a 100 GBASE-KR PHY or a 100 GBASE-CR PHY.

* * * * *